(12) United States Patent
Butera et al.

(10) Patent No.: US 6,792,976 B2
(45) Date of Patent: Sep. 21, 2004

(54) FLUID DISTRIBUTION DEVICE HAVING IMPROVED DEVIATING MEANS

(75) Inventors: Francesco Butera, Turin (IT); Marco Biasiotto, Turin (IT); Stefano Alacqua, Rivoli (IT)

(73) Assignee: C.R.F. Societa Consortile Per Azioni, Orbassano (IT)

( * ) Notice: Subject to any disclaimer, the term of this patent is extended or adjusted under 35 U.S.C. 154(b) by 0 days.

(21) Appl. No.: 10/344,984

(22) PCT Filed: Jun. 25, 2002

(86) PCT No.: PCT/IB02/02365
§ 371 (c)(1),
(2), (4) Date: Feb. 20, 2003

(87) PCT Pub. No.: WO03/002898
PCT Pub. Date: Jan. 9, 2003

(65) Prior Publication Data
US 2003/0168114 A1 Sep. 11, 2003

(30) Foreign Application Priority Data
Jun. 27, 2001 (IT) .................................... TO2001A0620

(51) Int. Cl.⁷ ................................................ F15C 3/00
(52) U.S. Cl. ...................... 137/831; 137/829; 137/839; 251/129.01; 251/129.06
(58) Field of Search ................................ 137/831, 829, 137/839; 251/129.07, 129.06

(56) References Cited

U.S. PATENT DOCUMENTS

| | | | |
|---|---|---|---|
| 3,269,419 A | * | 8/1966 | Dexter ........................ 137/829 |
| 3,556,119 A | * | 1/1971 | Ankeney ..................... 137/829 |
| 3,605,780 A | * | 9/1971 | Kranz ......................... 137/829 |
| 3,642,093 A | | 2/1972 | Schach |
| 3,754,576 A | | 8/1973 | Zetterstrom |
| 4,326,452 A | | 4/1982 | Nawa |
| 4,388,950 A | | 6/1983 | Stouffer |
| 5,067,509 A | | 11/1991 | Hunter |
| 5,272,486 A | | 12/1993 | Dickinson |
| 5,275,885 A | | 1/1994 | Ogura |
| 5,619,177 A | | 4/1997 | Block |
| 5,819,749 A | | 10/1998 | Lee |

FOREIGN PATENT DOCUMENTS

| | | |
|---|---|---|
| CH | 682 538 A | 10/1993 |
| DE | 199 16 244 C | 9/2000 |
| EP | 0 272 195 A | 6/1988 |
| GB | 2 021 265 A | 11/1979 |
| JP | 56 117039 A | 9/1981 |
| JP | 58 033046 A | 2/1983 |
| JP | 07 151039 A | 6/1995 |
| JP | 10 238516 A | 9/1998 |

* cited by examiner

*Primary Examiner*—A. Michael Chambers
(74) *Attorney, Agent, or Firm*—Sughrue Mion, PLLC

(57) ABSTRACT

A fluid distribution system comprised of an inlet duct (1) and two outlet ducts (6 and 7) including deviating means for directing the inlet flow into one or the other outlet ducts (6 and 7) composed of a mobile wall (2) suitable for making the flow adhere to the walls of one duct or the other due to the Coanda effect. In a first position, the mobile wall (2) is incorporated into the side wall (3) of the inlet conduct (1) that extends into one of the two outlet ducts. From this position, the mobile wall (2) can be moved to a second position where its upstream end protrudes inside the duct to create a step-like irregularity (4) on the duct's internal surface.

10 Claims, 2 Drawing Sheets

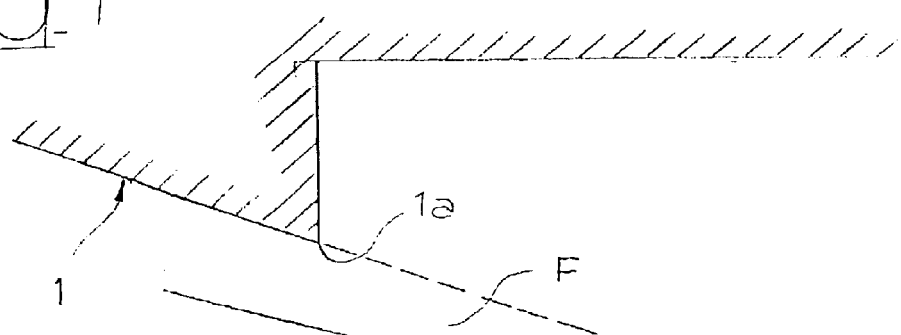
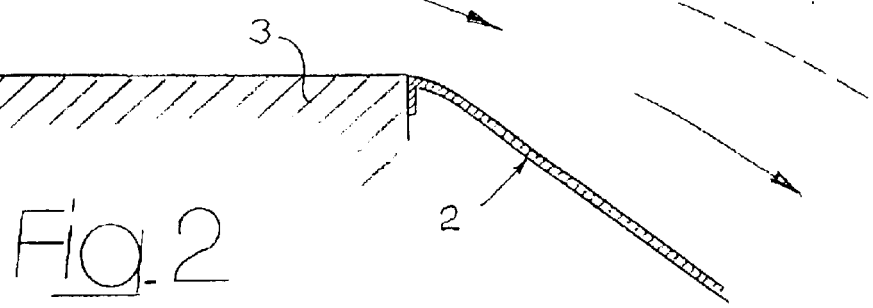
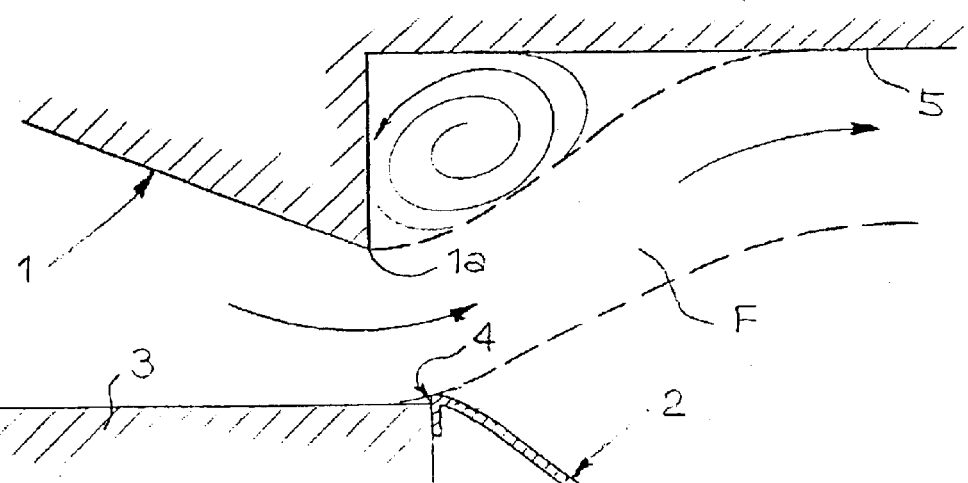
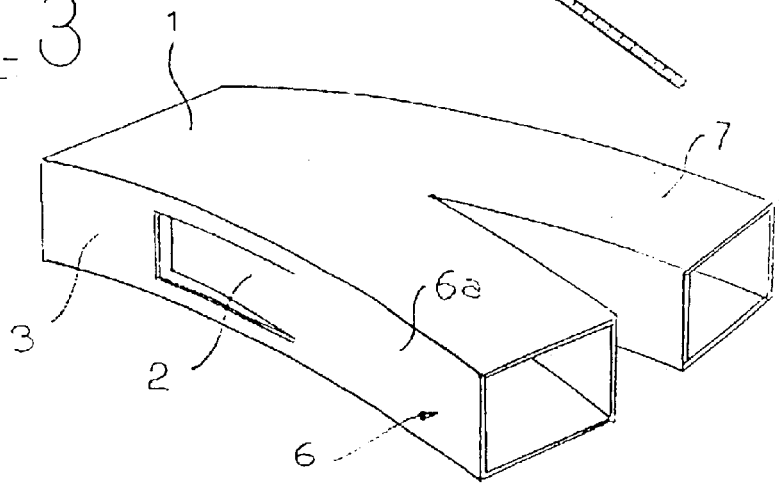

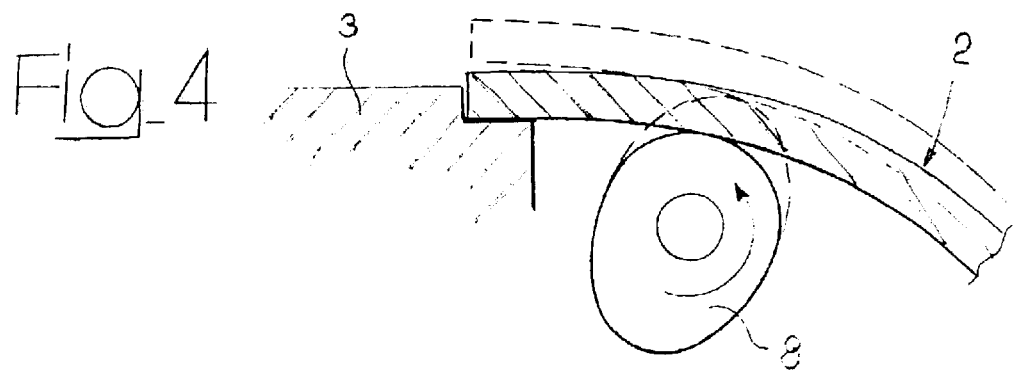
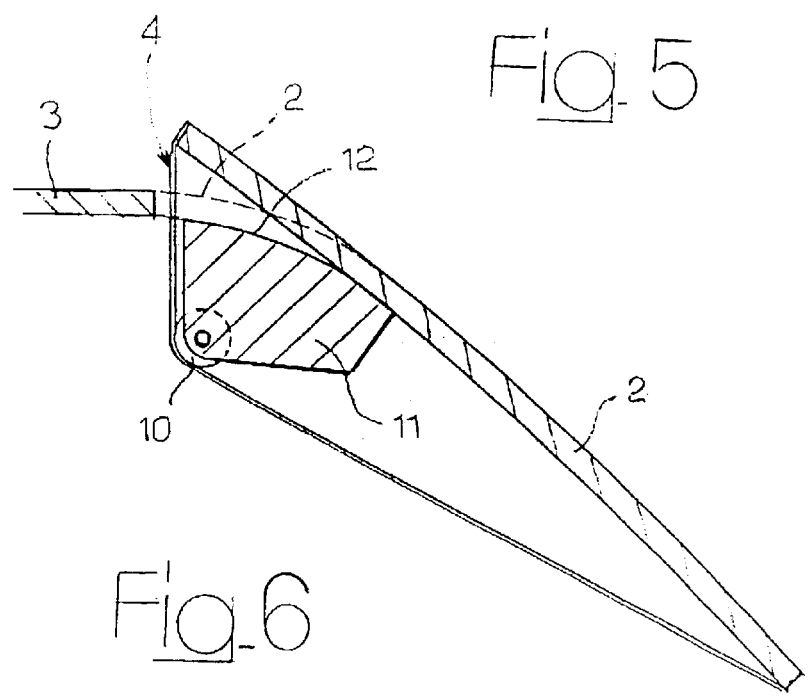
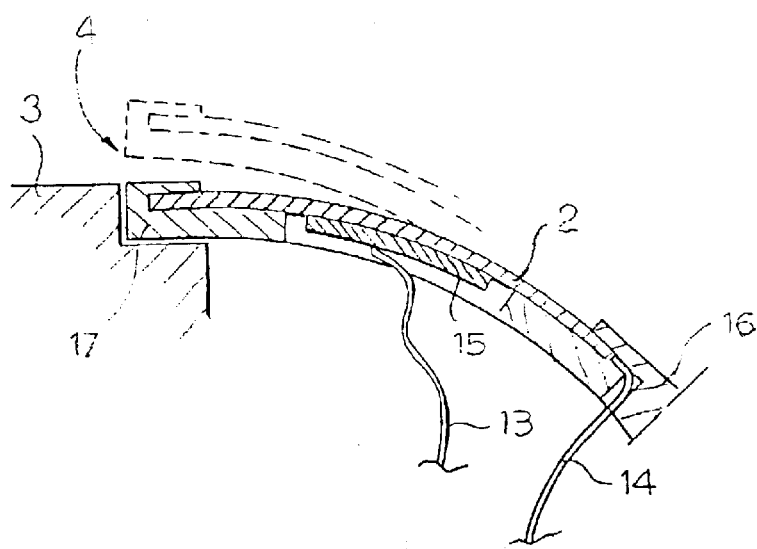

FLUID DISTRIBUTION DEVICE HAVING IMPROVED DEVIATING MEANS

This is a National Stage Entry of Application No. PCT/IB02/02365 filed Jun. 27, 2001. the disclosure of which is incorporated herein by reference.

BACKGROUND OF THE INVENTION

The present invention refers to fluid distribution devices of the type having an inlet duct that receives a fluid, two outlet ducts and deviating means for distributing the flow passing through the inlet duct between the two outlet ducts. The field of application to which the invention refers is generic, both with reference to the type of fluid (liquid or gaseous) and with reference to the system in which the distribution device is installed. Purely by way of example, the systems for distributing conditioned air in buildings or motor vehicles can be considered.

The Applicant has already proposed an air distribution device including Coanda-effect deviating means in Italian patent application TO2001A000223, filed on Mar. 12, 2001 and still secret at the date of filing this application. A motor vehicle dashboard incorporating this device also forms the subject of a further pending application by the same Applicant.

SUMMARY OF THE INVENTION

The object of this invention is that of providing a device of the initially indicated type equipped with improved deviating means, which are advantageous from the viewpoints of simplicity and functionality. In order to achieve this objective, the object of the invention is a fluid distribution device of the above-specified type, characterized by the fact that the said deviating means include a mobile wall suitable for controlling the deviation of the flow, which adheres to the walls due to the Coanda effect, the said mobile wall being moveable between a first position, in which it is incorporated in a side wall of the said inlet duct that extends to form a wall of the first of the said outlet ducts, such that the entire flow is made to adhere to it due to the Coanda effect, and is thus directed into the said first outlet duct, and a second position where the upstream end (with respect to direction of the flow) of the said mobile wall protrudes inside the duct to form an irregularity on the internal surface of the said side wall, provoking the separation of the flow from the said surface and its adherence to the second outlet duct, always due to the Coanda effect, resulting in its consequent deviation.

BRIEF DESCRIPTION OF THE DRAWINGS

The invention will now be described with reference to the enclosed drawings, supplied purely by way of a non-limitative example, where:

FIGS. 1 and 2 are schematic views of the deviating means in accordance with the invention in their two different operating states, which illustrate the invention's principle of operation, FIG. 3 is schematic view of a distribution device in accordance with the invention, and FIGS. 4–6 schematically illustrate three different forms of embodiment of the means of controlling the mobile wall forming part of the device in accordance with the invention.

DETAILED DESCRIPTION OF THE INVENTION

With reference to FIGS. 1 and 2, the direction of the flow F of a fluid (liquid or gaseous) arriving from an inlet duct 1 is controlled to direct the flow F towards two different outlet ducts (not visible in FIGS. 1 and 2). For this purpose, the device in accordance with the invention includes a mobile wall 2 that is incorporated into a side wall 3 that delimits the inlet duct 1 and which extends to form a side wall of one of the two outlet ducts.

The mobile wall 2 can be moved between a first position, illustrated in FIG. 1, in which it is flush with the wall 3, and a second position (illustrated in FIG. 2) where it creates a step-like irregularity 4 on the internal surface of the wall 3. In the first position, the output flow from the inlet duct 1 tends to remain in adherence to the wall 2, following the curve. In the second operating condition (FIG. 2), the irregularity 4 creates a separation of the flow F from the wall 3 and its deviation, which causes it to adhere to the opposite wall 5 that runs into the second outlet duct (not shown in FIGS. 1 and 2).

By way of example, FIG. 3 illustrates a section of the distribution device including an inlet duct 1 and the two outlet ducts 6 and 7, with the mobile wall 2 consisting of a cut-into portion of the wall 3, which runs into the side wall 6a of the first outlet duct 6.

FIG. 4 illustrates a first example of control device for the wall 2. In this case, the wall 2 is composed of an elastic element that tends to remain in its first operating position, illustrated in FIG. 4, i.e. in the position where the wall 2 is flush with the wall 3. From this position, the wall 2 can be elastically deformed in order to create a step 4 following the engagement of a rotating cam 8 controlled by any type of motorized means.

FIG. 5 illustrates a variant in which the wall 2 is still composed of an elastic element, but which instead tends to remain in the straight position shown in FIG. 5, where it creates the step-like irregularity 4 between the wall 3 and the wall 2. Starting from this condition, the wall 2 can be elastically deformed to bring it into the position illustrated by the dashed line, flush with the wall 3, via the traction applied by a shape memorizing wire 9 that runs between the ends of the wall 2 and engages a return roller 10 of a support 11 with a curved surface 12 against which the wall 2 rests when in the deformed condition. The shape memorizing wire 9 is made using any type of shape memorizing alloy that permits it to become shorter after the temperature increases beyond a predetermined transition value. Heating can be achieved via the Joule effect, by passing an electric current through the wire.

FIG. 6 illustrates a similar solution to that in FIG. 5, but where a thin sheet of a shape-memorizing alloy is buried inside an elastic wall 2. In the non-deformed condition (dashed line) the wall forms the step 4, while when its temperature exceeds a predetermined threshold value, the sheet deforms until it reaches the position shown with a continuous line. Heating is obtained by passing an electric current through a PTC heating element 15.

As already indicated above, the device in accordance with the invention is of general applicability. A non-limitative example of application is that of air distribution systems in buildings or air-conditioning distribution systems in motor vehicles.

From the previous description, it is clearly evident that in the device described by the invention, the flow always adheres to one or the other ducts due to the Coanda effect. The preference of adhering to one duct rather than the other is controlled by the position assumed by the mobile wall; in reality, the mobile wall disturbs the zone in which a depression bubble is created when the surface of the duct 6 is uninterrupted.

Naturally, the principle of the invention being understood, the constructional details and forms of embodiment could be extensively changed with respect to that described and illustrated by way of example without leaving the scope of this invention.

What is claimed is:

1. A fluid distribution device, having an inlet duct (1) that receives a fluid flow, two outlet ducts (6 and 7) and deviating means (2) for distributing the flow passing through the inlet duct (1) between the two outlet ducts (6 and 7), wherein the deviating means (2) includes a mobile wall for controlling deviation of the flow, which adheres to a surface of one or the other duct due to the Coanda effect, the mobile wall (2) being moveable between a first position, in which the mobile wall is incorporated in a side wall (3) of the inlet duct (1) and extends into a first of the outlet ducts (6), causing the entire flow to be directed into the first outlet duct (6), and a second position, in which an upstream end, with respect to direction of the flow, of the mobile wall (2) protrudes inside the duct to form an irregularity (4) on the internal surface of the side wall (3) of the first outlet duct, provoking the separation of the flow from the internal surface and its adherence to a second outlet duct (7), resulting in its deviation.

2. A device according to claim 1, wherein the mobile wall (2) forms a step on the internal surface of the duct when the mobile wall is in the second position.

3. A device according to claim 1, the mobile wall (2) is elastically deformable from the first position to the second position by cam means.

4. A device according to claim 1, wherein the mobile wall (2) is elastically deformable from the second position to the first position by shape memorizing means.

5. A device according to claim 4, wherein the shape memorizing means includes a shape memorizing wire, which can be heated by the passage of an electric current to cause contraction of the wire, the wire (9) being connected to the mobile wall (2) to elastically deform the mobile wall towards said first position follow contraction of the wire.

6. A device according to claim 4, wherein the shape memorizing means comprises a shape memorizing sheet buried inside the mobile wall (2) and is connected to terminals (13 and 14) to pass an electric current through the sheet for the purposes of heating the sheet by the Joule effect and thus elastically deforming the wall from the second position to the first position due to the shape memorizing effect of the sheet.

7. A device according to claim 6, wherein the terminals (13 and 14) are associated with a PTC element (15) for heating the shape memorizing sheet).

8. An air distribution system, comprising a fluid distribution as set forth in claim 1.

9. A motor vehicle comprising an air distribution system device as set forth in claim 1.

10. A fluid distribution device having an inlet duct that receives a fluid flow, two outlet ducts and deviating means for distributing the flow passing through the inlet duct between the two outlet ducts, wherein the deviating means includes a movable member for controlling the deviation of the flow which adheres to a surface of one or the other duct due to the Coanda effect, the movable member being movable between a first position in which the movable member is incorporated in a side wall of the inlet duct and extends into a first of the outlet ducts causing the entire flow to be directed into the first outlet duct, and a second portion in which an upstream end of the movable member protrudes inside the duct to form an irregularity on the internal surface of the sidewall of the first outlet duct provoking the separation of the flow from the internal surface and its adherence to a second outlet duct resulting in its deviation.

* * * * *